K. SCHMIDT.
BALL BEARING.
APPLICATION FILED OCT. 18, 1907.
926,294.
Patented June 29, 1909.
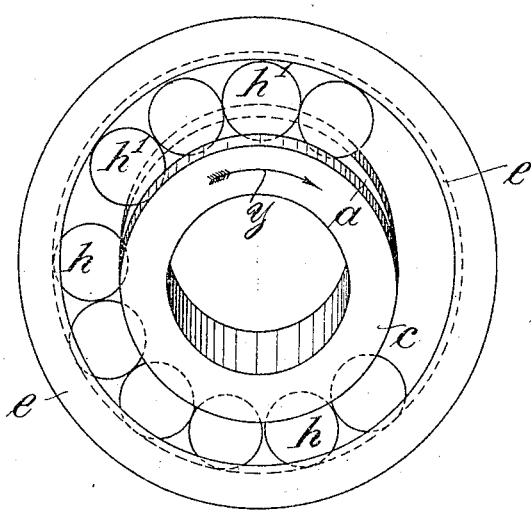
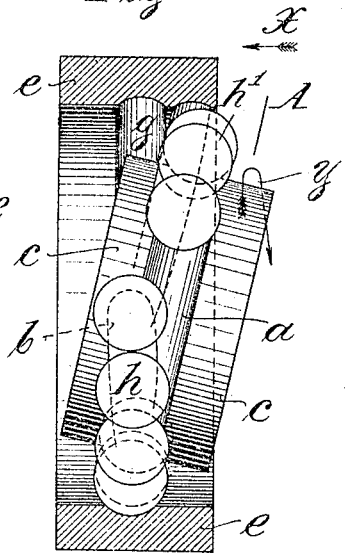
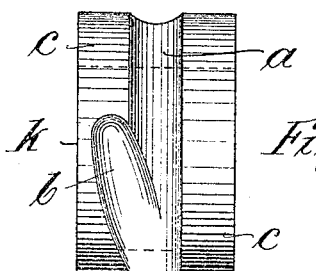
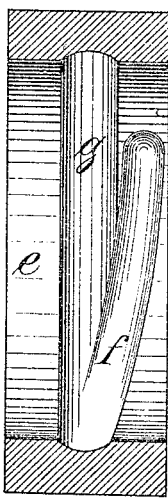
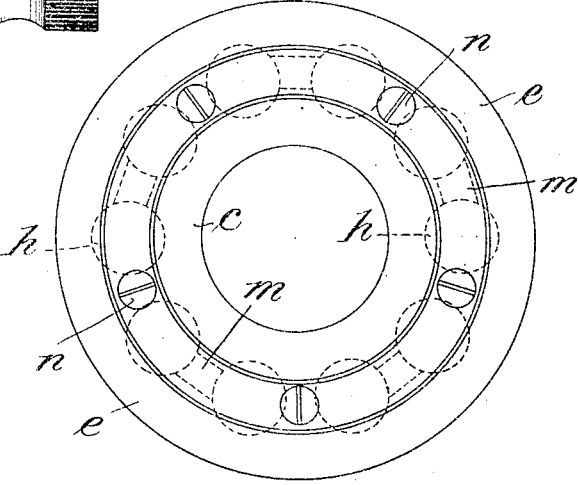

UNITED STATES PATENT OFFICE.

KARL SCHMIDT, OF BERLIN, GERMANY.

BALL-BEARING.

No. 926,294.

Specification of Letters Patent.

Patented June 29, 1909.

Application filed October 18, 1907. Serial No. 398,003.

*To all whom it may concern:*

Be it known that I, KARL SCHMIDT, a subject of the King of Prussia, German Emperor, and resident of 77 Pallisadenstrasse, Berlin, Kingdom of Prussia, German Empire, have invented certain new and useful Improvements in Ball-Bearings, of which the following is an exact specification.

This invention relates to ball bearings of the kind in which the balls run on a race formed by an inner and an outer complete ring, wheel part or the like. In such ball bearings there is danger of the balls falling out through the entrance groove or grooves or other entering means which have been found necessary in this type of bearing.

The object of the present invention is to avoid the difficulties of falling out which were always present in hitherto known constructions and at the same time to enable the use of rigid rings.

The construction of ball bearings according to the present invention comprises an inner and an outer complete ring arranged concentrically with balls between them and having entering grooves leading at an angle to the working grooves in said inner and outer rings respectively, the entering grooves being set on opposite sides of the working grooves on each of the rings.

The invention is illustrated in the accompanying drawings which form part of this specification and in which the invention is illustrated in one form by way of example.

Figures 1 and 2 show detached views of the inner and outer rings, the outer ring (Fig. 2) being in section. Fig. 3 shows the method of entering the balls in a ball bearing constructed according to this invention. Fig. 4 is a side view looking in the direction of the arrow X in Fig. 3. Fig. 5 is an outside-view of the ball bearing according to the present invention, after the parts are all assembled and the dust covers set in place.

In carrying the invention into effect according to the example shown in the drawings the outer ring $e$ is provided with a working groove $g$ and an entering groove $f$ which is set at an angle to the working groove $g$, but in the form shown does not extend the whole way to the edge $j$ of the ring $e$. The inner ring $c$ is also provided with a working groove $a$ and an entering groove $b$, the entering groove $b$ being arranged at an angle to the working groove $a$ and extending toward the side $k$ of the ring $c$. The side $k$ is, as shown in Figs. 1 and 2, arranged opposite to the side $j$ of the outer ring when the two parts are assembled in the manner which is hereafter described with reference to Figs. 3 and 4.

After the rings and balls are in place and distance pieces of any suitable form, and indicated in dotted lines, are inserted between alternate pairs of balls, side rings $m$ which act as dust protectors are added. These rings are fastened on each side of the bearing by means of screws and ferrules $n$ which pass parallel to the axis of the bearing and between the other alternate adjacent pairs of balls. Thus the distance pieces are inserted between one set of alternate adjacent pairs of balls and the screws $n$ are inserted between the remaining set of adjacent pairs of balls. This arrangement however does not form any part of the present invention and need not be further described. In the first place a number of the balls $h$ say 6 as shown in Fig. 4, are placed in the working groove of the outer ring $e$. The inner ring $c$ is then placed with its entrance groove $b$ over the balls which have been placed in the working groove of the outer ring. The inner ring thus takes up the inclined position (A—B) shown in Fig. 3 and some of the balls $h$ rest in the working groove $a$ of the inner ring $c$. The balls $h'$ are then inserted by means of the entrance groove $f$ in the outer ring $e$ which lies directly over the working groove $a$ on the inner ring, when the two rings are in the relative position shown in Figs. 1 and 2. The inner ring is then rotated in the direction of the arrow Y in Figs. 3 and 4, with the result that the balls come into the working grooves in both rings $c$ and $e$ and the inner ring comes into the same plane as the outer ring.

When the two rings are in one plane it will be seen that the balls cannot run into the entering grooves because the opposite wall of the working groove on the other member is complete and even in the position when both entering grooves are exactly opposite one another the balls cannot pass from their position in the working groove. In this way there is provided in the ball bearing according to this invention a complete holding of the balls in place at all points around the rings and the members or rings are complete or continuous throughout the whole circumference of the bearing. In some cases the entrance grooves may be carried right out to the edge of the inner and outer rings but this is not advisable as in such cases dirt and grit can readily gain access to the ball race. Other modifications might be made without departing from the invention.

Having thus fully described the nature of my invention, what I desire to secure by Letters Patent of the United States is:—

1. A ball bearing having in combination a complete ring having a working groove on its outer surface and an entering groove at an angle thereto, an outer ring having a working groove on its inner surface and an entering groove set at an angle thereto, said entering grooves being inclined toward opposite edges of the inner and outer members respectively, balls between, and in the working grooves on, said inner and outer rings, substantially as described.

2. A ball bearing having in combination a complete ring having a working groove on its outer surface and an entering groove at an angle thereto, an outer ring having a working groove on its inner surface and an entering groove set at an angle thereto, said entering grooves being inclined toward, but not reaching to the opposite edges of the inner and outer members respectively, balls between said inner and outer rings, substantially as described.

3. A ball bearing having in combination, a complete ring having a working groove on its outer surface and an entering groove at an angle thereto, an outer ring having a working groove on its inner surface and an entering groove set at an angle thereto, and extending toward the opposite side of the bearing to that toward which the first mentioned entering groove inclines, balls between said inner and outer rings, dust-protecting rings for said balls, substantially as described.

In witness whereof I have hereunto set my hand in the presence of two witnesses.

KARL SCHMIDT.

Witnesses:
  WOLDEMAR HAUPT,
  HENRY HASPER.